(12) United States Patent
Yamamoto

(10) Patent No.: US 7,159,615 B2
(45) Date of Patent: Jan. 9, 2007

(54) FLOW CONTROL VALVE

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 218 days.

(21) Appl. No.: 10/504,064

(22) PCT Filed: Feb. 12, 2003

(86) PCT No.: PCT/JP03/01440

§ 371 (c)(1),
(2), (4) Date: Aug. 10, 2004

(87) PCT Pub. No.: WO2004/072524

PCT Pub. Date: Aug. 26, 2004

(65) Prior Publication Data

US 2005/0076959 A1 Apr. 14, 2005

(51) Int. Cl.
F16K 31/02 (2006.01)
(52) U.S. Cl. .................. 137/596.17; 137/625.65; 137/625.68
(58) Field of Classification Search .......... 137/596.17, 137/596.1, 625.65, 625.68
See application file for complete search history.

(56) References Cited

U.S. PATENT DOCUMENTS 2,477,237 A * 7/1949 Carr .................. 137/596.1
3,977,425 A * 8/1976 Hayashida .............. 137/116.3
6,263,913 B1 * 7/2001 Kussel .................. 137/551
6,935,374 B1 * 8/2005 Yamamoto .............. 137/627.5

FOREIGN PATENT DOCUMENTS

| JP | 64-036777 | 2/1989 |
| JP | 02-058179 | 4/1990 |
| JP | 09-222180 | 8/1997 |
| JP | 2000-055211 | 2/2000 |
| JP | 2001-254866 | 9/2001 |

* cited by examiner

Primary Examiner—Eric Keasel
Assistant Examiner—Craig Schneider

(57) ABSTRACT

A flow rate control valve comprising a valve body having an input port, an output port and an exhaust port, a valve means that is arranged in the valve body and controls the communication of the ports, and an electromagnetic operation means for driving the valve means. The valve means has a first valve body having a first valve portion that is seated on a partitioning plate disposed in a communication chamber formed between the input port and the output port and a first valve portion provided at one end portion, and a second valve body having a valve portion that comes in contact with the second valve portion. Diameters of the slide surfaces at which the slide portions of the first valve body and the second valve body come in slide contact with seals, a diameter of a contact portion at which the first valve portion of the first valve body comes in contact with the partitioning plate, and a diameter of the contact portion at which the valve portion of the second valve body comes in contact with the second valve portion of the first valve body, are set to be equal to each other.

1 Claim, 6 Drawing Sheets

FLOW CONTROL VALVE

TECHNICAL FIELD

The present invention relates to a flow rate control valve for controlling a flow rate of a fluid such as the air. More specifically, the invention relates to a flow rate control valve for controlling the flow rate in proportion to the output of an electromagnetic operation means.

BACKGROUND ART

As a flow rate control valve for controlling a flow rate in proportion to the output of an electromagnetic operation means, there is generally used a spool valve in which a spool arranged in the sleeve to be allowed to slide therein is brought to a position where the attractive force of an electromagnetic solenoid is balanced with the reactive force of the spring.

The spool valve is so constituted that the spool slides along the inner peripheral surface of the sleeve having ports formed in the side surface thereof. Therefore, it needs having a clearance between the sleeve and the spool, and a complete sealing cannot be attained because it is not allowed to use a seal such as rubber or the like. To enhance the sealing between the sleeve and the spool, the clearance between them must be minimized, and yet retaining sliding performance. To satisfy this requirement, however, a highly precise machining is required, resulting in an increase in cost of machining. Further, the spool valve causes malfunction if a dust or the like enters between the sleeve and the spool. In order to solve such problem of the spool valve-type flow rate control valve, the present applicant has proposed a flow rate control valve of the poppet valve type in JP-A 2000-55211.

The flow rate control valve proposed in the above JP-A 2000-55211 is of the two-way valve type of flow rate control valve which must be used in combination with another valve for changing over the intake and the exhaust, arousing such problems that the fluid circuit constitution becomes complex and that the another valve used in combination is operated with great frequency.

The present invention has been done in view of the above-mentioned facts, and its principal technical assignment is to provide a flow rate control valve of three-way valve type capable of controlling the flow rate in proportion to the output of an electromagnetic operation means by using a poppet valve means that features good sealing.

DISCLOSURE OF THE INVENTION

According to the present invention, in order to solve the above-mentioned principal technical assignment, there is provided a flow rate control valve comprising a valve body having an input port, an output port and an exhaust port, a valve means that is arranged in the valve body and controls a communication between the ports, and an electromagnetic operation means for driving the valve means; which is characterized in:

that the valve body is provided with a communication chamber for communicating the input port with the output port, and two valve holes formed, being opposed to each other, on both sides of the communication chamber, the communication chamber having an annular partitioning plate arranged therein;

that the valve means is composed of:

a first valve body having a slide portion that is provided at one end portion thereof and is slidably fitted to one of the valve holes, a first valve portion having a tapered surface that is formed at a central portion thereof and is seated on a seat portion formed in the inner periphery of the annular partitioning plate, a second valve portion provided at the other end portion thereof, and a communication passage that penetrates through in the axial direction and communicates with the exhaust port;

a second valve body having a slide portion slidaby fitted to the other valve hole, a valve portion that is provided at one end portion thereof and comes in contact with the second valve portion of the first valve body, and a communication passage that penetrates through in the axial direction and communicates with the exhaust port;

a first seal disposed between the slide portion of the first valve body and the inner peripheral surface of the one valve hole;

a second seal disposed between the slide portion of the second valve body and the inner peripheral surface of the other valve hole;

a first spring for urging the first valve body in a direction in which the first valve portion is seated on the seat portion of the partitioning plate; and a second spring that is disposed between the first valve body and the second valve body and urges them in the directions in which they separate away from each other;

that diameters of the slide surfaces of the first seal and the second seal, a diameter of a contact portion at which the first valve portion of the first valve body is seated on the seat portion of the partitioning plate, and a diameter of a contact portion at which the valve portion of the second valve body comes in contact with the second valve portion of the first valve body are set to be equal; and that the electromagnetic operation means is so constituted as to operate the second valve body toward the first valve body side when it is energized.

BEST MODE FOR CARRYING OUT THE INVENTION

Preferred embodiments of the flow rate control valve constituted according to the present invention will now be described with reference to the accompanying drawings.

Figure 1:
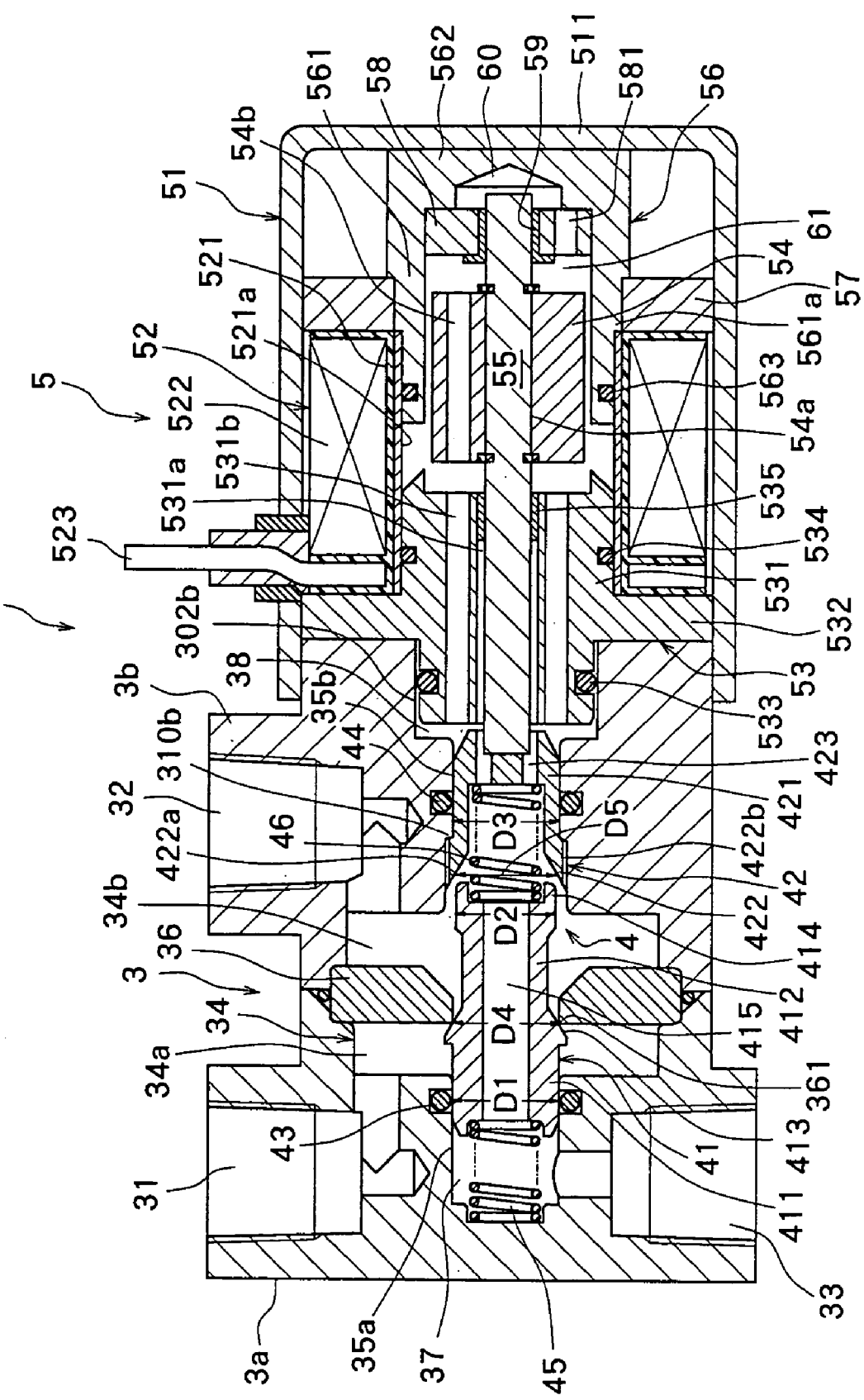
FIG. 1 is a sectional view illustrating a first embodiment of a flow rate control valve constituted according to the present invention.

FIG. 1 is a first embodiment of the flow rate control valve constituted according to the present invention.

A flow rate control valve 2 of the illustrated embodiment comprises a valve body 3, a valve means 4 disposed in the valve body 3, and an electromagnetic operation means 5 for driving the valve means 4. In the illustrated embodiment, the valve body 3 is constituted by two body pieces 3a and 3b. An input port 31, an output port 32 and an exhaust port 33 are formed in the valve body 3 constituted by the two body pieces 3a and 3b. A communication chamber 34 for communicating the input port 31 with the output port 32 is formed in the central portion of the valve body 3. Further, the valve body 3 is provided with two valve holes 35a and 35b formed, being opposed to each other, on both sides of the communication chamber 34. One valve hole 35a is formed at the central portion of one body piece 3a, is opened to the communication chamber 34, and is communicated with the exhaust port 33. The other valve hole 35b is formed at the central portion of the other body piece 3b on the same axis as the valve hole 35a, and is opened to the communication chamber 34. An annular partitioning plate 36 is disposed in the communication chamber 34 formed in the valve body 3 composed of two body pieces 3a and 3b, and the communication chamber 34 is divided into an input-side chamber 34a and an output-side chamber 34b by the partitioning plate 36 and the valve means 4 that will be described later.

The valve means 4 arranged in the valve body 3 has a first valve body 41 slidably disposed in one valve hole 35a and a second valve body 42 slidably disposed in the other valve hole 35b. The first valve body 41 has a slide portion 411 that is provided at one end portion thereof and is slidably fitted into the valve hole 35a, a central small-diameter portion 412, and a first valve portion 413 having a tapered surface that is formed between the slide portion 411 and the central small-diameter portion 412 and is seated on a seat portion 361 formed in the inner periphery of the partitioning plate 36, and a second valve portion 414 provided at the other end portion. An outer diameter (D1) of the slide portion 411 constituting the first valve body 41 is equal to an outer diameter (D2) of the second valve portion 414. A communication passage 415 penetrating through in the axial direction is formed in the first valve body 41, and this communication passage 415 is communicated with the exhaust port 33 through a first pressure chamber 37 formed between the body piece 3a and the one end side of the first valve body 41, i.e., the left end in FIG. 1. A first seal 43 that comes in slide contact with the outer peripheral surface of the above slide portion 411 is mounted on part of the inner peripheral surface of the valve hole 35a formed in the body piece 3a. The first seal 43 works to partition the input-side chamber 34a, i.e., the input port 31, of the communication chamber 34 from the first pressure chamber 37, i.e., the exhaust port 33.

The second valve body 42 slidably disposed in the above valve hole 35b has a slide portion 421 slidably fitted into the valve hole 35b, and a valve portion 422 that is formed at one end portion thereof, i.e., at an end portion on the side opposed to the first valve body 41 and has a diameter larger than that of the slide portion 421. The valve portion 422 constituting the second valve body 42 has a seat portion 422a that is formed at an end portion opposed to the second valve portion 414 of the first valve body 41 and has a tapered inner peripheral surface with which the outer peripheral edge of the second valve portion 414 comes in contact. A communication groove 422b penetrating through in the axial direction is formed in the periphery of the valve portion 422. A communication passage 423 penetrating through in the axial direction is formed in the second valve body 42. The communication passage 423 is communicated with the exhaust port 33 through the communication passage 415 formed in the first valve body 41 and the first pressure chamber 37, and is also communicated with a second pressure chamber 38 formed on the other end side of the second valve body 42, i.e., on the right side in FIG. 1. Therefore, the first pressure chamber 37 and the second pressure chamber 38 are communicated together, through the communication passage 415 formed in the first valve body 41 and the communication passage 423 formed in the second valve body 42. A second seal 44 that comes into slide contact with the outer peripheral surface of the above slide portion 411 is mounted on part of the inner peripheral surface of the valve hole 35b formed in the body piece 3b. This second seal 44 partitions the output-side chamber 34b, i.e., the output port 32 of the communication chamber 34 from the second pressure chamber 38, i.e., the exhaust port 33. In the illustrated embodiment, an example has been shown in which a seat portion 422a was formed on the valve portion 422 of the second valve body 42 in a relationship between the second valve portion 414 of the first valve body 41 and the valve portion 422 of the second valve body 42. However, the seat portion may be formed on the second valve portion 414 of the first valve body 41.

In the illustrated embodiment, diameters of the slide surfaces, which respectively come in slide contact with the first seal 43 and the second seal 44, namely, an outer diameter (D1) of the slide portion 411 of the first valve body 41 and an outer diameter (D3) of the slide portion 421 of the second valve body 42, a diameter (D4) of the contact portion (i.e., a diameter of the seat portion 361 of the partitioning plate 36) at which the first valve portion 413 having a tapered surface of the first valve 41 is seated on a seat portion 361 of the partitioning plate 36, and a diameter (D5) of the contact portion (i.e., an outer diameter (D2) of the second valve portion 414) in the seat portion 422a having a tapered inner peripheral surface of the second valve body 42, with which the outer peripheral edge of the second valve portion 414 of the first valve body 41 comes in contact, all are constituted to be equal to each other. In the illustrated embodiment, the first seal 43 and the second seal 44 are mounted on the valve body 3 and, hence, the diameters of the slide surface that come in slide contact with the seals become the outer diameter (D1) of the slide portion 411 of the first valve body 41 and the outer diameter (D3) of the slide portion 421 of the second valve body 42. When the first seal 43 and the second seal 44 are mounted respectively on the first valve body 41 and on the second valve body 42, the diameters of the slide surfaces that come in slide contact with the seals become the inner diameters of the valve hole 35a and of the valve hole 35b formed in the valve body 3.

Figure 2:
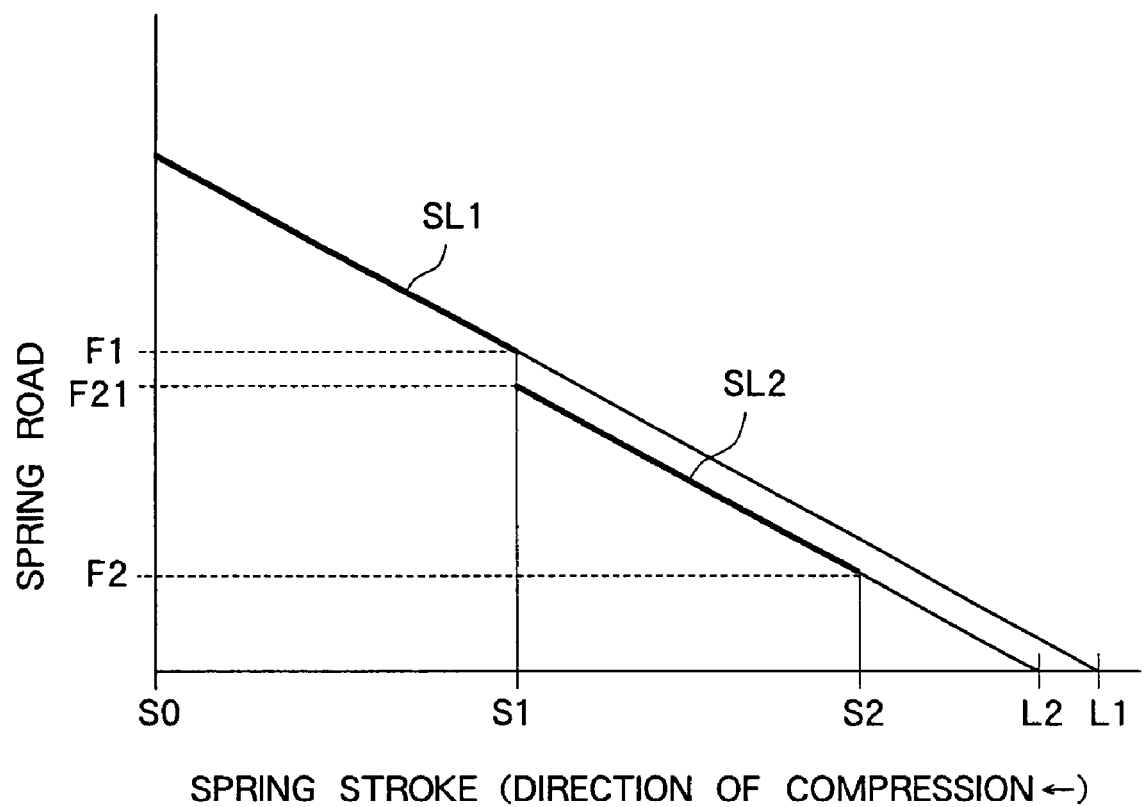
FIG. 2 is a diagram illustrating spring characteristics of first and second springs that constitute the flow rate control valve shown in FIG. 1.

A first compression coil spring 45 is disposed in the first pressure chamber 37, and urges the first valve body 41 toward the right in FIG. 1, i.e., urges the first valve portion 413 of the first valve body 41 in a direction in which it is seated on the seat portion 361 of the partitioning plate 36. Further, a second compression coil spring 46 is disposed between the first valve body 41 and the second valve body 42, and urges the both valve bodies in the directions in which they separate away from each other. Here, the spring characteristics and the set pressures of the first compression coil spring 45 and of the second compression coil spring 46 will be described with reference to FIG. 2.

The first compression coil spring 45 has a length L1 in a free state and, when set, is compressed up to a first set position S1. The set load at this moment is F1. A load of the first compression coil spring 45 thus set changes linearly from the first set position S1 up to a compression end position S0 along a first coil spring load line SL1. The second compression coil spring 46 has a length L2 in a free state and, when set, is compressed up to a second set position S2. The set load at this moment is F2. A load of the second compression coil spring 46 thus set changes linearly from the second set position S2 up to the first set position S1, at which the second valve body 42 comes in contact with the first valve body 41, along a second coil spring load line SL2. The spring load in a state where the second compression coil spring 46 is compressed up to the first set position S1, that is, the load of the second compression coil spring 46 at its full stroke is F21, which is smaller than the set load F1 of the first compression coil spring 45. Here, the first coil spring load line SL1 of the first compression coil spring 45 and the second coil spring load line SL2 of the second compression coil spring 46, are set to have the same angle of inclination, i.e., the same spring constant.

When the first compression coil spring 45 and the second compression coil spring 46 both having the above spring constant are arranged as shown in FIG. 1, the first valve portion 413 of the first valve body 41 is seated on the seat portion 361 of the partitioning plate 413 due to the spring load of the first compression coil spring 45, and the right end in the drawing of the valve portion 422 constituting the second valve body 42 is brought into contact with a stepped portion 310b formed on the left end side in the drawing of the valve hole 35b in the body piece 3b. In a set state as shown in FIG. 1, therefore, a gap is formed between the seat portion 422a having the tapered inner peripheral surface that constitutes the valve seat portion 422 of the second valve body 42 and the outer peripheral edge of the second valve portion 414 that constitutes the first valve body 41.

Next, described below is the electromagnetic operation means 5 for driving the above-mentioned valve means 4.

The electromagnetic operation means 5 in the illustrated embodiment comprises a casing 51 mounted on the right end in the drawing of the body piece 3b that constitutes the valve body 3, an electromagnetic coil unit 52 arranged in the casing 51, a fixed yoke 53 for forming a magnetic path generated by the electromagnetic coil unit 52, a moving yoke 54 attracted by the magnetic force generating in the fixed yoke 53 in the electromagnetic coil unit 52, and an operation rod 55 coupled to the moving yoke 54. The electromagnetic coil unit 52 is composed of an annular bobbin 521 made of a suitable synthetic resin, a coil 522 wound on the bobbin 521, and lead wires 523 for supplying electric power to the coil 522.

The fixed yoke 53 is made of a magnetic material, and comprises a cylindrical portion 531 and an annular portion 532 formed, in the radial direction, at an intermediate portion in the axial direction of the cylindrical portion 531, the annular portion 532 being held between the body piece 3b and the electromagnetic coil unit 52. Further, the cylindrical portion 531 that constitutes the fixed yoke 53 is fitted, at a portion on the left in the drawing of the annular portion 532, into a fitting hole 302b formed in the body piece 3b and is fitted, at a portion on the right in the drawing of the annular portion 532, into a central hole 521a of the annular bobbin 521 constituting the electromagnetic coil unit 52. In the cylindrical portion 531 that constitutes the fixed yoke 53, there is formed an insertion hole 531a penetrating through the central portion thereof in the axial direction, and there are further formed a plurality of communication holes 531b penetrating through in the axial direction on the outer side in the radial direction of the insertion hole 531a. A seal 533 is mounted on the outer periphery of a portion on the left in the drawing of the annular portion 532 of the cylindrical portion 531 constituting the fixed yoke 53 to seal a gap relative to the inner peripheral surface of the fitting hole 302b of the body piece 3b. Further, a seal 534 is mounted on the outer periphery of a portion on the right in the drawing of the annular portion 532 of the cylindrical portion 531 constituting the fixed yoke 53 to seal a gap relative to the inner peripheral surface of the central hole 521a of the annular bobbin 521.

The moving yoke 54 is made of a magnetic material, and is disposed on the right in FIG. 1 of the fixed yoke 53 so as to be allowed to approach it and separate away therefrom. A fitting hole 54a is formed in the moving yoke 54, penetrating through the central portion thereof in the axial direction, and a communication hole 54b is formed on the outer side in the radial direction of the fitting hole 54a in the moving yoke 54, penetrating through it in the axial direction. The operation rod 55 is made of a nonmagnetic material such as a stainless steel or the like, disposed being inserted in the insertion hole 531a formed in the central portion of the cylindrical portion 531 that constitutes the fixed yoke 53, and is supported by a bush 535 mounted on the inner peripheral surface of the insertion hole 531a so as to slide in the axial direction. The operation rod 55 is fitted, at its right end in FIG. 1, into the fitting hole 54a in the moving yoke 54, and is so constituted as to operate integrally with the moving yoke 54 in the axial direction. The operation rod 55 is so constituted that its left end, i.e., the front end thereof in FIG. 1 comes into contact with the right end in FIG. 1 of the second valve body 42.

In the casing 51, a support member 56 for supporting the right end, i.e., the rear end in FIG. 1 of the operation rod 55 is disposed. This support member 56 has a cylindrical portion 561 and a bottom portion 562 formed at the right end in FIG. 1 of the cylindrical portion 561. The left end in FIG. 1 of the cylindrical portion 561 is fitted into the central hole 521a of the annular bobbin 521 that constitutes the electromagnetic coil unit 52, and the bottom portion 562 thereof is arranged in contact with the bottom portion 511 of the casing 51. A stepped portion 561a is formed at the outer periphery on the right side in FIG. 1 of a fitting portion, which fits into the bobbin 521, of the cylindrical portion 561 of the support member 56, and the positioning of the bobbin 521 is made by bringing the bobbin 521 into contact with the stepped portion 561a. Further, an annular holding member 57 is fitted into the stepped portion 561a to hold a coil unit 52 between itself and the annular portion 532 constituting the fixed yoke 53. A seal 563 is mounted on the outer periphery of the fitting portion that fits into the bobbin 521 in the cylindrical portion 561 constituting the support member 56 thereby to seal a gap relative to the inner peripheral surface of the central hole 521a of the annular bobbin 521.

A support ring 58 is disposed in the support member 56, and a bush 59 is fitted onto the inner periphery of the support ring 58. The rear end portion of the operation rod 55 is supported by the bush 59 so as to slide in the axial direction. A communication hole 581 is formed in the support ring 58, penetrating it through in the axial direction. A third pressure chamber 60 is formed on the rear end side of the operation rod 55, i.e., between the bottom portion 562 of the support member 56 and the support ring 58 and bush 59. The third pressure chamber 60 is communicated with the operation chamber 61 of the moving yoke 54 through the communication hole 581 provided in the support ring 58. Therefore, the second pressure chamber 38 and the third pressure chamber 60 are communicated with each other through the communication hole 531b formed in the cylindrical portion constituting the fixed yoke 53, the communication hole 54b formed in the moving yoke 54, the operation chamber 61 and the communication hole 581 formed in the support ring 58. The second pressure chamber 38 and the first pressure chamber 37 are communicated with each other through the communication passage 423 formed in the second valve body 42 and the communication passage 415 formed in the first valve body 41. Accordingly, the first pressure chamber 37, the second pressure chamber 38 and the third pressure chamber 60 are communicated with each other.

The flow rate control valve 2 in the first embodiment is constituted as described above. The operation will be described hereinbelow with reference to FIGS. 3 and 4.

FIG. 1 illustrates a state where no voltage is applied to the coil 522 of the electromagnetic coil unit 52 that constitutes the electromagnetic operation means 5. In this state, the first valve portion 413 of the first valve body 41 is seated on the seat portion 361 of the partitioning plate 36, and a gap is formed between the seat portion 422a of the second valve body 42 and the outer peripheral edge of the second valve portion 414 constituting the first valve body 41, as described above. Therefore, the communication is interrupted between the input port 31 and the output port 32, and the output port 32 is communicated with the exhaust port 33 via the output-side chamber 34b in the communication chamber 34, the gap between the seat portion 422a of the second valve body 42 and the second valve portion 414 constituting the first valve body 41, the communication passage 415 formed in the first valve body 41, and the first pressure chamber 37. As a result, the operation chamber of an actuator (not shown) connected to the output port 32 by a pipe (not shown) is communicated with the exhaust port 33 and hence, the actuator is kept in the non-operating state.

Described below is a balance of pressure of the first valve body 41 in the state shown in FIG. 1.

A pressure in the input port 31 acts on the first valve body 41. However, the outer diameter (D1) of the slide portion 411 of the first valve body 41, which is the diameter of the slide surface that comes in slide contact with the first seal 43 is equal to the diameter (D4) of the contact portion at which the first valve portion 413 of the first valve body 41 comes in contact with the partitioning plate 36. Therefore, no thrust due to a pressure in the input port 31 generates in the first valve body 41.

Further, a pressure in the output port 32 acts on the first valve body 41. However, the diameter (D5) of the contact portion (the outer diameter (D2) of the second valve portion 414) at which the outer peripheral edge of the second valve portion 414 of the first valve body 41 comes in contact with the seat portion 422a of the second valve body 42 is equal to the diameter (D4) of the contact portion at which the first valve portion 413 of the first valve body 41 comes in contact with the partitioning plate 36. Therefore, no thrust due to a pressure in the output port 32 generates in the first valve body 41.

Further, a pressure in the exhaust port 33 acts on the first valve body 41. However, the outer diameter (D1) of the slide portion 411 is equal to the diameter (D4) of the contact portion. Therefore, no thrust due to a pressure in the exhaust port 33 generates in the first valve body 41.

Next, described below is a balance of pressure of the second valve body 42 in the state shown in FIG. 1.

A pressure in the output port 32 acts on the second valve body 42. However, the diameter (D5) of the contact portion, with which the outer peripheral edge of the second valve portion 414 of the first valve body 41 comes in contact, of the seat portion 422a of the second valve body 42 is equal to the outer diameter (D3) of the slide portion 421 of the second valve body 42, which is the diameter of the slide surface that comes in slide contact with the second seal 44. Therefore, no thrust due to a pressure in the output port 32 generates in the second valve body 42.

Further, a pressure in the exhaust port 33 acts on the second valve body 42. However, the diameter (D5) of the contact portion is equal to the outer diameter (D3) of the slide portion 421. Therefore, no thrust due to a pressure in the exhaust port 33 generates in the second valve body 42.

Therefore, the second valve body 42 receives only the force of the electromagnetic operation means 5 and the force of the second compression coil spring 46. Accordingly, the second valve body 42 remains still at a point at which the driving force of the electromagnetic operation means 5 is balanced with the reaction force of the second compression coil spring 46.

Figure 3:
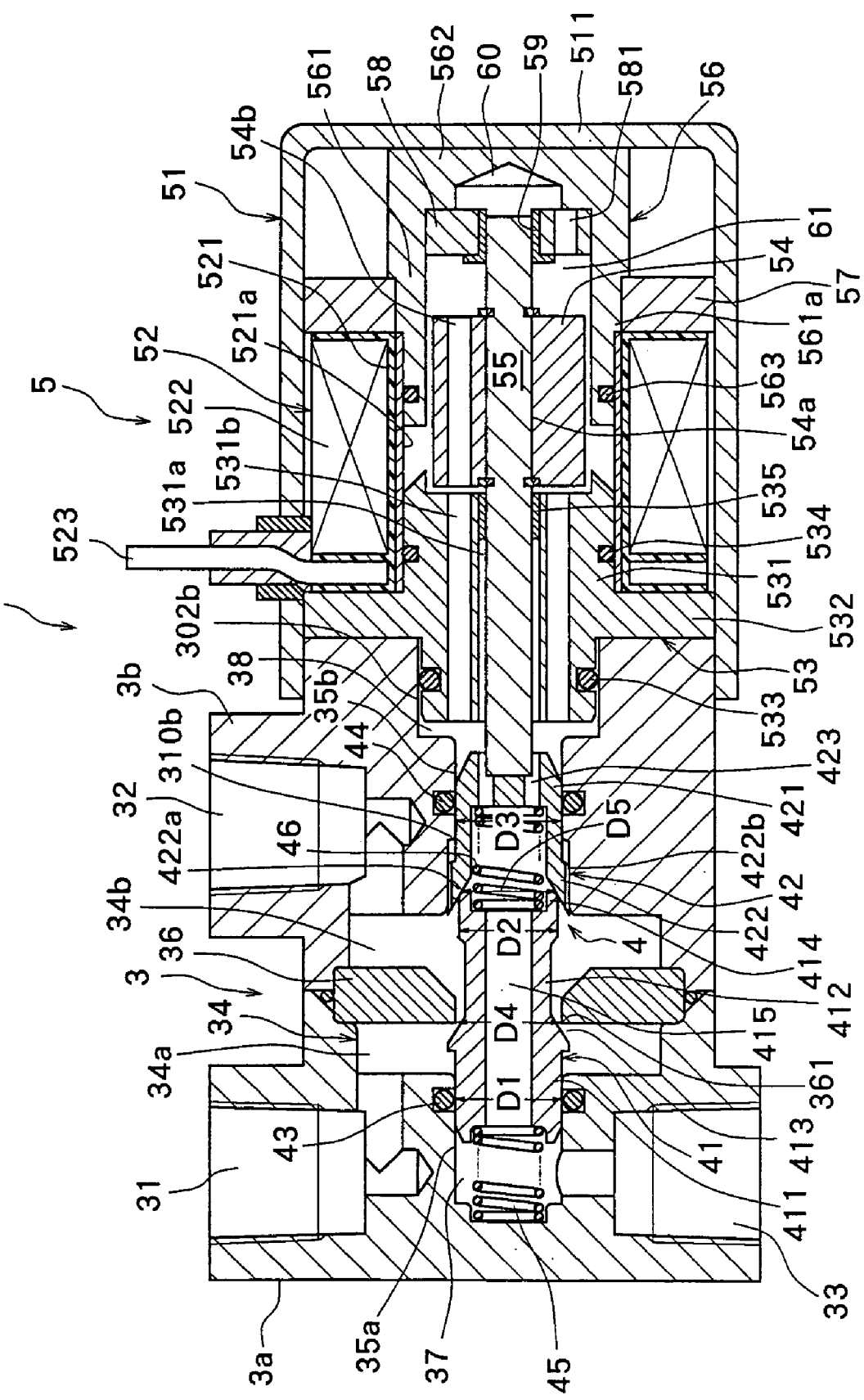
FIG. 3 is a sectional view illustrating a first operation state of the flow rate control valve of FIG. 1.

When a voltage is applied to the coil 522 of the electromagnetic coil unit 52 in the state shown in FIG. 1, a magnetic path is formed through the fixed yoke 53, and the moving yoke 54 is attracted by the fixed yoke 53 to move leftward in FIG. 1. With the movement of the moving yoke 54, the operation rod 55 moves leftward thereby to cause the second valve body 42 to move toward the left against the spring force of the second compression coil spring 46. As a result, the seat surface 422a of the second valve body 42 comes into contact with the outer peripheral edge of the second valve portion 414 that constitutes the first valve body 41, and the first valve body 41 is caused to move leftward against the spring force of the first compression coil spring 45, as shown in FIG. 3. Consequently, the first valve portion 413 of the first valve body 41 is separated away from the seat portion 361 of the partitioning plate 36 and is opened, and a fluid supplied to the input port 31 is fed to the actuator (not shown) from the output port 32 through the input-side chamber 34a and the output-side chamber 34b of the communication chamber 34.

Here, as described above, the outer diameter (D1) of the slide portion 411 of the first valve body 41 and the outer diameter (D3) of the slide portion 421 of the second valve body 42 which are diameters of the slide surfaces that each come in slide contact with the first seal 43 and the second seal 44 constituting the valve means 4, the diameter (D4) of the contact portion (i.e., the diameter of the seat portion 361 of the partitioning plate 36), at which the first valve 413 having a tapered surface, of the first valve body 41 is seated on the seat portion 361 of the partitioning plate 36, and the diameter (D5) of the contact portion (the outer diameter (D2) of the second valve portion 414) in the seat portion 422a having a tapered inner peripheral surface of the second valve body 42, with which the outer peripheral edge of the second valve portion 414 of the first valve body 41 comes in contact, all are constituted to be equal to each other. Therefore, no thrust due to the pressure of the fluid generates in the first valve body 41 and the second valve body 42. Consequently, the second valve body 42 receives only the force of the electromagnetic operation means 5 and the force of the first compression coil spring 45 acting via the first valve body 41. Accordingly, the second valve body 42 and the first valve body 41 becomes integral together, and remains still at a point at which the driving force of the electromagnetic operation means 5 is balanced with the reaction force of the second compression coil spring 46 in a state where the seat surface 422a of the second valve body 42 is in contact with the outer peripheral edge of the second valve portion 414 that constitutes the first valve body 41.

Described below is a case where the flow rate control valve 2 is operated to supply the fluid to the input port 31 and further, to the actuator (not shown) from the output port 32 to drive the actuator, and, then, to bring the actuator to a halt at a predetermined operation position.

Figure 4:
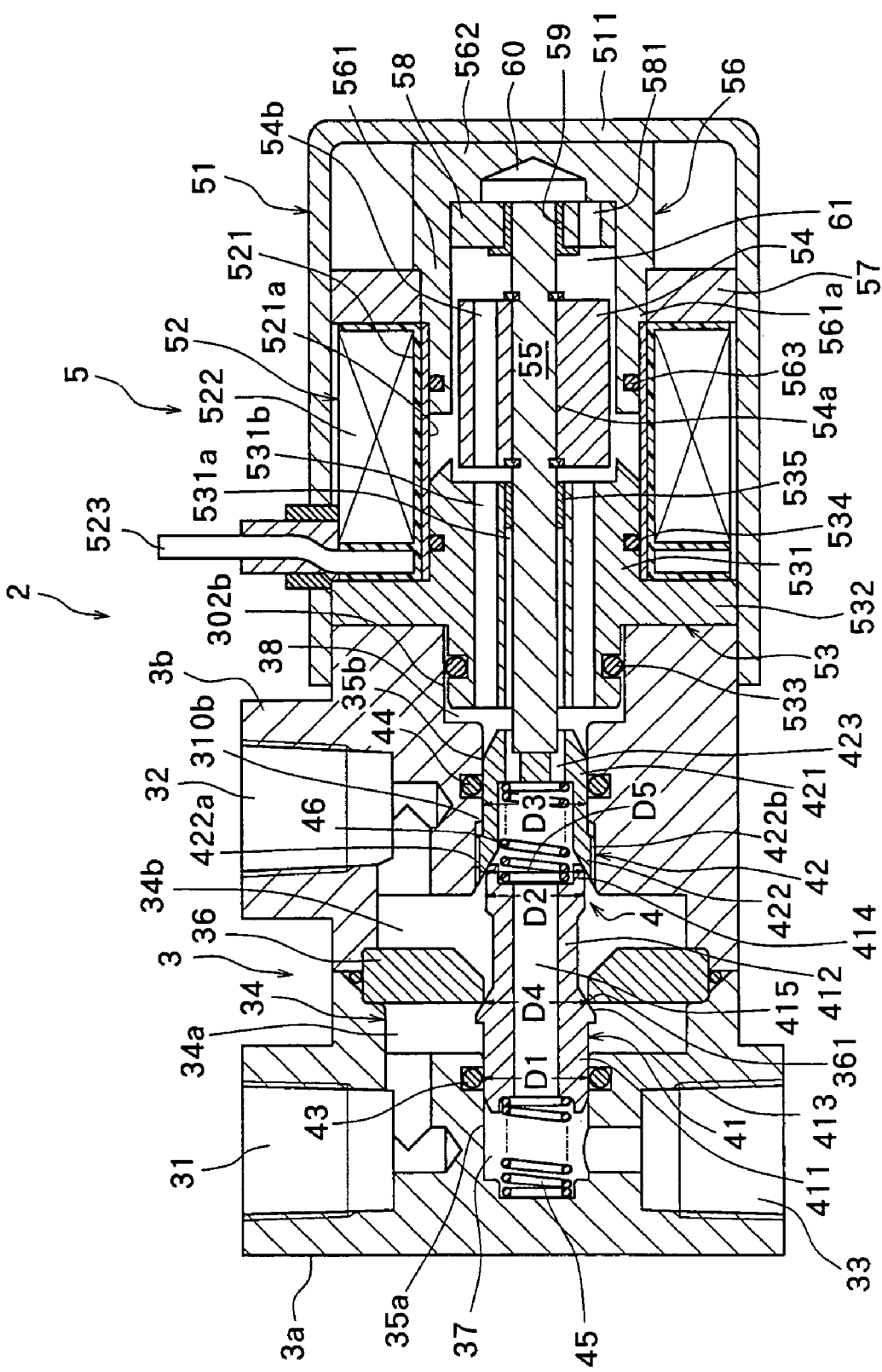
FIG. 4 is a sectional view illustrating a second operation state of the flow rate control valve of FIG. 1.

Namely, in a state shown in FIG. 3, a voltage applied to the coil 522 of the electromagnetic coil unit 52 is decreased to bring the driving force of the electromagnetic operation means 5, that is, the attractive force of the electromagnetic solenoid to lie in a range smaller than the load F1 of the first compression coil spring 45 but larger than the load F21 at the full stroke of the second compression coil spring 46. As a result, the first valve body 41 and the second valve 42 move toward the right in the drawing by the spring force of the first compression coil spring 45, and come into a halt at positions where the first valve portion 413 of the first valve body 41 is seated on the seat portion 361 of the partitioning plate 36, as shown in FIG. 4. Therefore, the communication is interrupted between the input port 31 and the output port 32 and hence, the actuator (not shown) comes into a halt at a predetermined operation position.

Next, to return the actuator (not shown) back to the operation start position, the supply of electric power to the coil 522 of the electromagnetic coil unit 52 is interrupted to de-energize the electromagnetic solenoid. As a result, the members of the flow rate control valve 2 return to the state shown in FIG. 1. In the state shown in FIG. 1, as described above, the first valve portion 413 of the first valve body 41 is seated on the seat portion 361 of the partitioning plate 36 and hence, a gap is formed between the seat portion 422a of the second valve body 41 and the second valve portion 414 that constitutes the first valve body 41. Therefore, the communication between the input port 31 and the output port 32 is interrupted, and the output port 32 is communicated with the exhaust port 33 through the output-side chamber 34b of the communication chamber 34, the gap between the seat portion 422a of the second valve body 42 and the second valve portion 414 constituting the first valve body 41, the communication passage 415 formed in the first valve body 41, and the first communication chamber 37. Consequently, the operation fluid in the operation chamber of the actuator (not shown) connected to the output port 32 is caused to drain out from the exhaust port 33, and the actuator returns to the operation start position.

As described above, the flow rate control valve 2 according to the illustrated embodiment is a three-way valve which controls the input port 31, the output port 32 and the exhaust port 33 by a valve means 4 having the first valve body 41 and the second valve body 42. Therefore, the intake and the exhaust can be changed over by using only the flow rate control valve 2. Since there is no need of using another valve for changing over the intake and the exhaust in combination, the fluid circuit constitution is simplified. Besides, the valve means 4 having the first valve body 41 and the second valve body 42 is of the poppet valve type, giving a reliable sealing and no occurrence of malfunctioning because foreign matter such as dust and dirt adhered to the seat portions can be flown away with the operation fluid.

Figure 5:
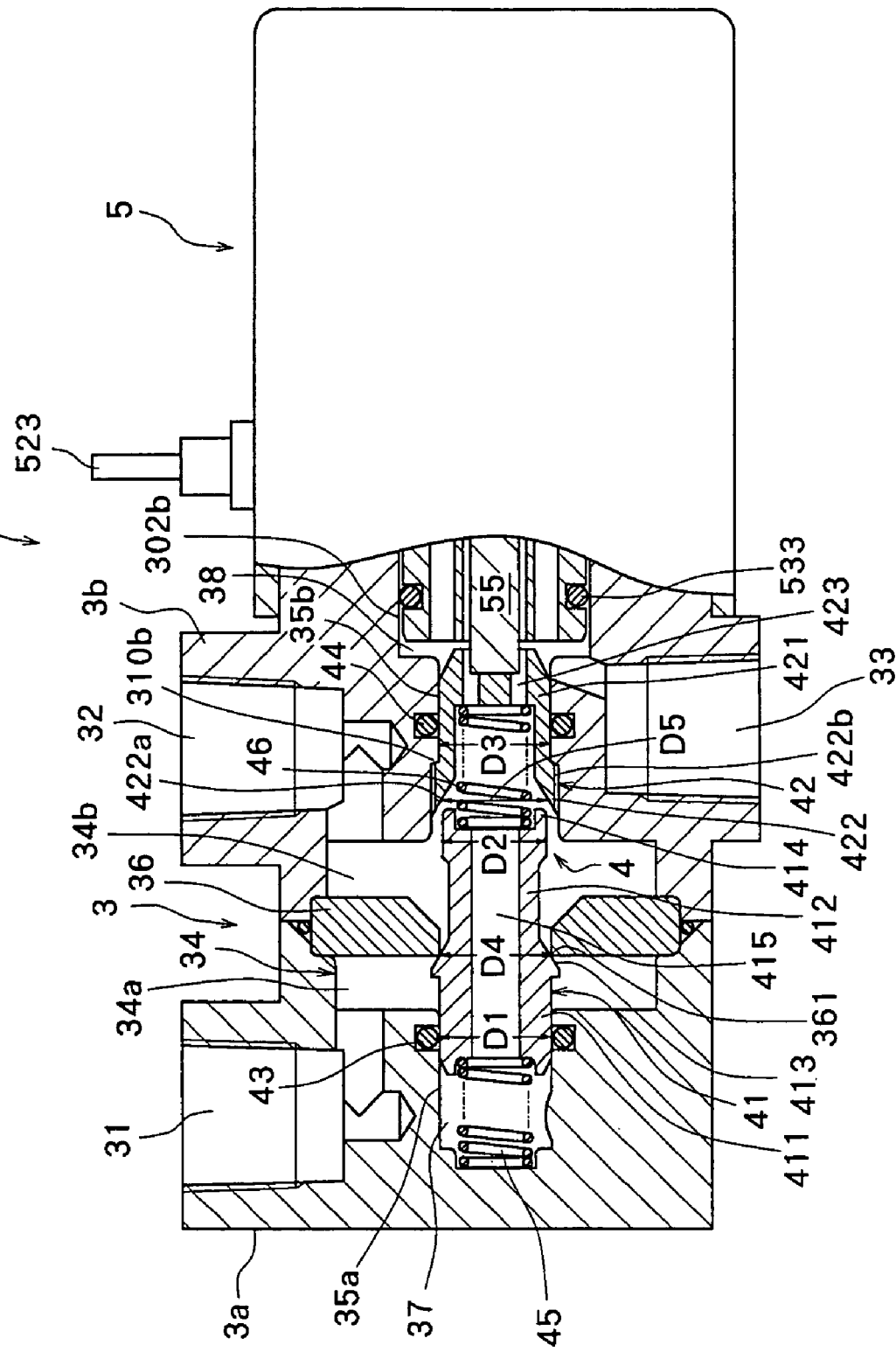
FIG. 5 is a sectional view illustrating a second embodiment of the flow rate control valve constituted according to the present invention.

Next, a second embodiment of the flow rate control valve according to the invention will be described with reference to FIG. 5. In the flow rate control valve 2a of the second embodiment shown in FIG. 5, the same members as those constituting the flow rate control valve 2 of the first embodiment are denoted by the same reference numerals, and their description is not repeated.

The flow rate control valve 2 according to the first embodiment is different from the flow rate control valve 2a according to the second embodiment in a point that in the flow rate control valve 2 in the first embodiment, the first pressure chamber 37 communicates with the exhaust port 33, whereas in the flow rate control valve 2a in the second embodiment is communicating the second pressure chamber 38 with the exhaust port 33. As described above, the first pressure chamber 37 and the second pressure chamber 38 are communicated with each other through the communication passage 415 formed in the first valve body 41 and the communication passage 423 formed in the second valve body 42. Therefore, the function is substantially the same, and the flow rate control valve 2a of the second embodiment, too, exhibits the same action and effect as those of the flow rate control valve 2 of the first embodiment.

Figure 6:
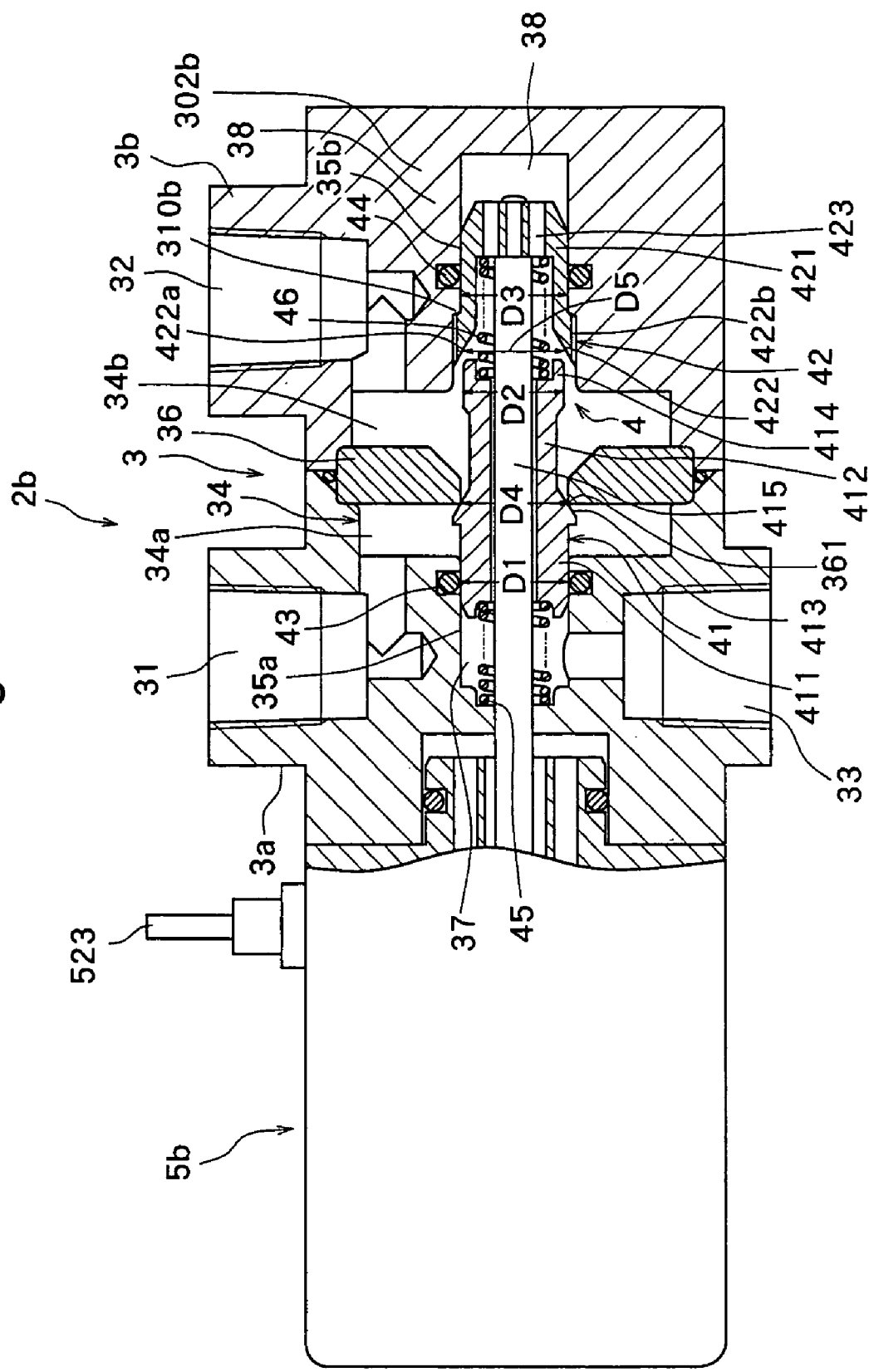
FIG. 6 is a sectional view illustrating a third embodiment of the flow rate control valve constituted according to the present invention.

Next, a third embodiment of the flow rate control valve according to the invention will be described with reference to FIG. 6. In the flow rate control valve 2b of the third embodiment shown in FIG. 6, the same members as those constituting the flow rate control valve 2 of the first embodiment and the flow rate control valve 2a of the second embodiment are denoted by the same reference numerals, and their description is not repeated.

The flow rate control valve 2b according to the third embodiment has a special feature in that the second valve body 42 of the valve means 4 is operated by an electromagnetic operation means 5b of the pull type. In the illustrated flow rate control valve 2b, the electromagnetic operation means 5b is disposed on the left in the drawing of the valve means 4. The operation rod 55 constituting the electromagnetic operation means 5b is disposed being inserted in the communication passage 415 formed in the first valve body 41 and in the communication passage 423 formed in the second valve body 42, and is coupled to the second valve body 42 with its front end (right end in FIG. 6) being caulked. In the thus constituted flow rate control valve 2b of the third embodiment, the electromagnetic operation means 5b is energized to move the operation rod 55 toward the left in FIG. 6, thereby to move the second valve body 42 toward the left against the spring force of the second compression coil spring 46 and to move the first valve body 42 toward the left against the spring force of the first compression coil spring 45. The valve means 4 constituted by the first valve body 41 and the second valve body 42 operates in the same manner as that of the flow rate control valve 2 of the first embodiment and the flow rate control valve 2a of the second embodiment, and exhibits the same action and effect as those of the above-mentioned embodiments.

INDUSTRIAL APPLICABILITY

Being constituted as described above, the flow rate control valve according to the present invention exhibits action and effect as described below.

That is, in the flow rate control valve according to the present invention, diameters of the slide portions of a first seal that is disposed between the slide portion of the first valve body and the inner peripheral surface of one valve hole and a second seal that is disposed between the slide portion of the second valve body and the inner peripheral surface of the other valve hole, a diameter of the contact portion at which the first valve portion of the first valve body is seated on a seat portion of the partitioning plate, and a diameter of the contact portion at which the second valve portion of the first valve body is seated on a seat portion of the second valve body are set to be equal to each other. Therefore, the pressure of the fluid generates no driving force in the axial direction even when the pressure of the operation fluid that flows from the input port to the output port through the communication chamber acts on the first valve body and the second valve body. Accordingly, the valve works as a proportional valve in which the amount, i.e., the flow rate of stroke (opening areas of valves) of the first valve body and the second valve body, varies in proportion to the operation force of the electromagnetic operation means.

Further, the flow rate control valve according to the present invention is a three-way valve which controls the input port, the output port and the exhaust port by a valve means having the first valve body and the second valve body. Therefore, the intake and the exhaust can be changed over by using the one flow rate control valve. Since there is no need of using another valve for changing over the intake and the exhaust in combination, the constitution of fluid circuit is simplified. Besides, the valve means having the first valve body and the second valve body is of the poppet valve type, giving a reliable sealing and no occurrence of malfunctioning because foreign matter such as dust and dirt adhered to the seat portions can be flown away with the operation fluid.

The invention claimed is:

1. A flow rate control valve comprising:
    a valve body having an input port, an output port and an exhaust port;
    a valve means that is arranged in said valve body and controls a communication between said ports; and
    an electromagnetic operation means for driving said valve means; which is characterized in:
    that said valve body is provided with a communication chamber for communicating said input port with said output port, and two valve holes formed, being opposed to each other, on both sides of said communication chamber, said communication chamber having an annular partitioning plate arranged therein;
    that said valve means is composed of:
    a first valve body having a slide portion that is provided at one end portion thereof and is slidably fitted into one of said valve holes, a first valve portion having a tapered surface that is formed at the central portion thereof and is seated on a seat portion formed in the inner periphery of said annular partitioning plate, a second valve portion provided at another end portion, and a communication passage that penetrates through in the axial direction and communicates with said exhaust port;
    a second valve body having a slide portion slidably fitted into the other valve hole, a valve portion that is provided at one end portion thereof and comes in contact with the second valve portion of said first valve body, and a communication passage that penetrates through in the axial direction and communicates with said exhaust port;
    a first seal disposed between said slide portion of said first valve body and the inner peripheral surface of said one valve hole;
    a second seal disposed between said slide portion of said second valve body and the inner peripheral surface of said other valve hole;
    a first spring for urging said first valve body in a direction in which said first valve portion is seated on said seat portion of said partitioning plate; and
    a second spring disposed between said first valve body and said second valve body to urge them in the directions in which they separate away from each other;
    that diameters of the slide surfaces of said first seal and said second seal, a diameter of the contact portion at which said first valve portion of said first valve body is seated on said seat portion of said partitioning plate, and a diameter of the contact portion at which the valve portion of said second valve body comes into contact with said second valve portion of said first valve body are set to be equal; and
    that said electromagnetic operation means is so constituted as to operate said second valve body toward said first valve body side when it is energized.

* * * * *

UNITED STATES PATENT AND TRADEMARK OFFICE
CERTIFICATE OF CORRECTION

PATENT NO. : 7,159,615 B2 Page 1 of 1
APPLICATION NO. : 10/504064
DATED : January 9, 2007
INVENTOR(S) : Yamamoto It is certified that error appears in the above-identified patent and that said Letters Patent is hereby corrected as shown below:

On the Title Page: Item (54) Title should read -- (54) Title: FLOW <u>RATE</u> CONTROL VALVE --.

Signed and Sealed this

Fifteenth Day of May, 2007

JON W. DUDAS
*Director of the United States Patent and Trademark Office*